United States Patent [19]

Dürr

[11] Patent Number: 4,570,499
[45] Date of Patent: Feb. 18, 1986

[54] SWING BRIDGE

[75] Inventor: Helmut Dürr, Frankfurt am Main, Fed. Rep. of Germany

[73] Assignee: Braun Aktiengesellschaft, Kronberg, Fed. Rep. of Germany

[21] Appl. No.: 598,898

[22] Filed: Apr. 10, 1984

[30] Foreign Application Priority Data

Apr. 29, 1983 [DE] Fed. Rep. of Germany ....... 3315642

[51] Int. Cl.⁴ ............................................. F16H 21/22
[52] U.S. Cl. .......................................... 74/44; 74/49; 74/581; 30/43.91; 30/43.92
[58] Field of Search ............................ 74/44, 49, 581; 30/43.91, 43.92

[56] References Cited

U.S. PATENT DOCUMENTS

| 3,365,796 | 1/1968 | Tolmie et al. | 30/43.92 |
| 4,065,977 | 1/1978 | Buzzi et al. | 74/49 |
| 4,312,126 | 1/1982 | Rochelt | 74/581 |
| 4,428,117 | 1/1984 | Horii et al. | 30/43.91 |

FOREIGN PATENT DOCUMENTS

| 2117319 | 4/1971 | Fed. Rep. of Germany. | |
| 2749936 | 11/1977 | Fed. Rep. of Germany. | |
| 2910469 | 3/1979 | Fed. Rep. of Germany. | |
| 3213099 | 10/1983 | Fed. Rep. of Germany | 30/43.92 |
| 58-5585 | 1/1983 | Japan. | |
| WO81/00288 | 2/1981 | PCT Int'l Appl. | 74/49 |

Primary Examiner—Albert J. Makay
Assistant Examiner—David W. Westphal
Attorney, Agent, or Firm—Raymond J. De Vellis

[57] ABSTRACT

In a swing bridge for conversion of rotary motion of an eccentric driven by a motor shaft into a reciprocating movement of the power output for a tool in electrically powered appliances, consisting of a bridge yoke comprising the power output and mounted on two strip-shaped film hinges and a connecting rod coupled to the swing bridge and the eccentric, aligned parallel to the bridge yoke, one of the strip-shaped film hinges and the corresponding wall of the bridge yoke are each provided with an opening through which the connecting rod is guided in such fashion that the connecting rod head coupled with the eccentric lies outside the space defined by the bridge yoke and the film hinge and whereby the bridge yoke forms a rigid unit with the formed walls.

5 Claims, 3 Drawing Figures

SWING BRIDGE

BACKGROUND OF THE INVENTION

The invention relates to a swing bridge for converting the rotary motion of an eccentric driven by a motor shaft into a reciprocating motion of a power output for a tool in electrically powered appliances, consisting of a bridge yoke comprising the power output and mounted on two film hinges, with walls disposed perpendicularly thereto and with a connecting rod coupled to the swing bridge and the eccentric and aligned parallel to the bridge yoke.

Such swing bridges are known from German OS No. 21 17 319 and German AS No. 27 49 936 and are used primarily in dry shavers; however they are also suitable for electrical massagers, toothbrushes, and files.

In designing swing bridges for the requred swing amplitude, certain dimensioning rules have also been maintained for the connecting rod to ensure the required rigidity in the swing direction and flexibility transversely thereto. However, in an attempt to observe these rules, connecting rod dimensions frequently result which are suitable only for relatively large span widths of the swing bridge between the film hinges serving as supporting elements, or folded designs result (German AS No. 27 49 936 and German No. 05 29 10 469) which tend not only to have increased space requirements widthwise but also have a tendency toward frequency-dependent instabilities which can be controlled only at increased expense and with close tolerances. In addition, the arrangement of the motor in the housing, which depends on the point of coupling between its eccentric and the connecting rod head, complicates the installation and arrangement of the other necessary electrical components in the housing.

A swing bridge is known from Japanese Utility Model No. Y2-58-5585, wherein the bridge yoke consists of a plate provided with a power output and strip-shaped film hinges formed thereon, as well as a connected rod formed eccentrically on the plate. In order for the connecting rod formed laterally on the plate to execute a motion corresponding to the eccentric stroke, a bulge is provided in the long side of one of the strip-shaped film hinges. By virtue of the direct forming of the film hinges and the connecting rod on the plate and the lateral bulge in one of the film hinges, the resultant bridge yoke exhibits unstable behavior and tends toward uncontrolled movements which result in losses of the useful linear working movement.

German OS. No. 29 10 469 teaches a swing frame with a swing beam supported on the housing by two pairs of flexibly elastic strips. The flexibly elastic strips of each pair of strips are coupled together by webs in FIG. 6 whereby an additional web can be provided to stabilize the two pairs of strips. The connecting rod which urges the swing beam into an oscillating motion is part of an additional swing frame consisting partially of flexibly elastic strips and formed on the swing beam. However, as a result of the deformation of the flexibly elastic pairs of strips connected with the swing beam, no exact linear motion of the swing beam is ensured in the devices according to this known publication.

The goal of the invention is therefore to provide a swing bridge in which the disadvantages of devices according to the state of the art do not exist and wherein greater freedom in the arrangement and dimensions of all the named components with respect to the requirements stated hereinabove is ensured and by means of which the rotary movement of an eccentric driven by a motor shaft is optimally converted into a linearly reciprocating motion.

According to one advantageous embodiment of the invention, the connecting rod engages the wall located opposite the wall provided with the opening.

The rigidity of the swing bridge can be further increased according to the invention by the rigid unit being reinforced by at least one strip and a web.

Advantageously the swing bridge is mounted suspended in the housing, whereby the pressure exerted on the drive by connected tools is advantageously accepted by the strip-shaped film hinges without deformation thereof.

Advantageously the swing bridge is mounted suspended in the housing, whereby the pressure exerted on the drive by connected tools is advantageously accepted by the strip-shaped film hinges without deformation thereof.

BRIEF DESCRIPTION OF THE DRAWINGS

The invention is described hereinbelow with reference to the drawing wherein.

DETAILED DESCRIPTION

Figure 1:
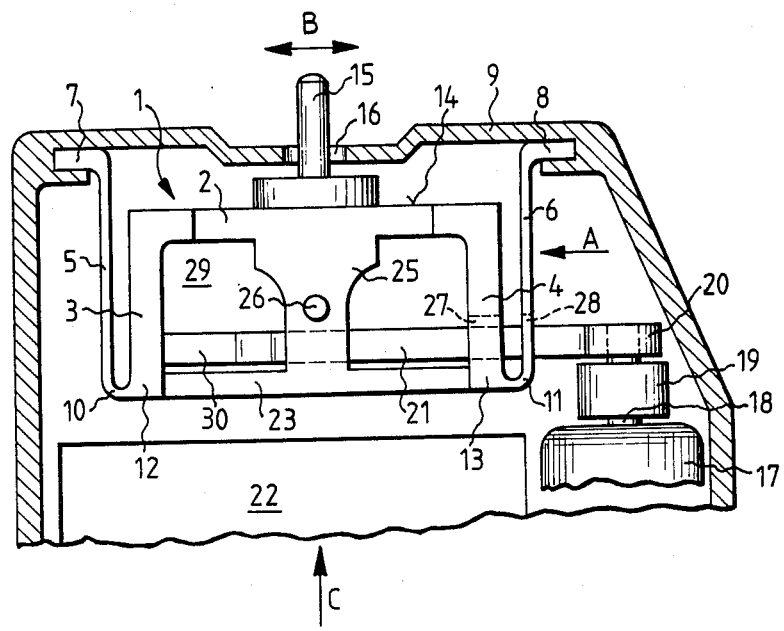
FIG. 1 is a side elevation of a swing bridge with motor, installed in the housing of an electrical appliance shown schematically.

The embodiment of a swing bridge 1 shown in FIG. 1 consists essentially of a bridge yoke 2 on which two walls, projecting at approximately right angles, are formed, and two strip-shaped film hinges 5 and 6 running parallel to walls 3 and 4. Film hinges 5 and 6 are fastened by their ends 7 and 8 in housing 9 of the appliance, while the free ends 10 and 11 merge with free ends 12 and 13 of walls 3 and 4. Bridge yoke 2 of swing bridge 1, which reciprocates in the direction of double arrow B, is then mounted suspended in housing 9.

A drive 15 in the form of a pin is provided in the top 14 of bridge yoke 2 of swing bridge 1, said pin projecting through a cutout 16 in housing 9 of the electrical appliance, to transfer the linear oscillation of swing bridge 1 to tools connected to drive 15, as for example the cutter assembly of a shaver.

An electric motor 17 with a vertical shaft 18 is disposed laterally next to swing bridge 1 in housing 9, the eccentric 19 of said motor being coupled to connecting rod head 20 of a connecting rod 21. The lateral arrangement of motor 17 and swing bridge 1 side by side provides sufficient room for installing electrical connecting elements as well as primary or secondary batteries, said parts being represented schematically by a rectangular cutout 22.

Swing bridge 1 can be manufactured in known fashion in one piece from plastic, whereby bridge yoke 2 and walls 3 and 4 form a rigid unit, which remains largely free of deformations.

Two strips 23 and 24 are provided on the side opposite top 14 of bridge yoke 2, in swing direction B, said strips connecting the free ends 12 and 13 of walls 3 and 4 with each other. Bridge yoke 2 then forms a rigid cage together with walls 3 and 4 and strips 23 and 24, said cage allowing no deformation of any kind under load.

A web 25 is provided parallel to walls 3 and 4, said web connecting strips 23 and/or 24 with bridge yoke 2. A further power output 26 in the form of a pin is formed on web 25, said output serving to drive another tool on the electrical appliance, for example a trimmer on a shaver. The web or webs 25 likewise make an additional contribution to the rigidity of the cage formed by bridge yoke 2, walls 3 and 4, and strips 23 and 24.

Connecting rod 21 serves to drive swing bridge 1, said rod being pivotably articulated to one rigid wall 3 in the vicinity of the free end 12 of said wall, and being guided through opening 27 in wall 4 as well as through opening 28 in film hinge 6, so that connecting rod head 20 of connecting rod 21 projects out of the space 29 in housing 9 occupied by the swing bridge. Connecting rod head 20 is coupled to eccentric 19 mounted on shaft 18 of motor 17. Connecting rod 21 has a reduced cross section in the vicinity of connecting point 30 with wall 3 to ensure its elasticity transversely to the swing direction, arrow B.

Figure 2:
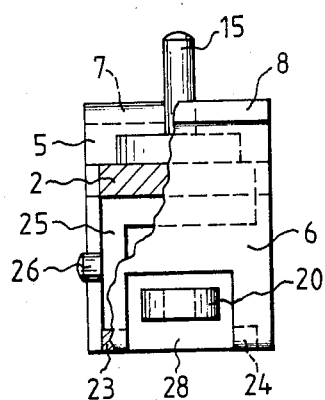
FIG. 2 is a view of the swing bridge looking of the direction of arrow A in FIG. 1.

FIG. 2 shows a side elevation of swing bridge 1 according to FIG. 1 in the direction of arrow A with a partially cutaway wall of film hinge 6 as well as a partial section through bridge yoke 2. Swing bridge 1 comprises two strips 23 and 24. A web 25 with a power output 26 is formed on strip 23. A rectangular opening 28 is provided in the wall of film hinge 6, in the end of the film hinge which is opposite end 8, through which opening 28 connecting rod 21 with connecting rod head 20 is guided.

Figure 3:
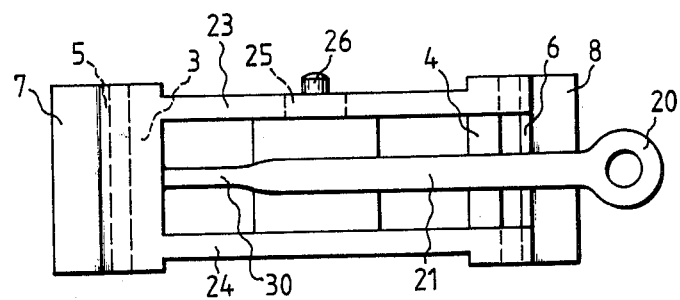
FIG. 3 is a view of the swing bridge looking in the direction of arrow C in FIG. 1.

FIG. 3 shows a view of the swing bridge according to FIG. 1 in the direction of arrow C. In this embodiment of swing bridge 1, the latter is open in the vicinity of strips 23 and 24 and walls 3 and 4, through which connecting rod 21 with its reduced cross section in the vicinity of connecting point 30 with wall 3 is visible. According to a modified embodiment of swing bridge 1, not shown here, strips 23 and 24 and walls 3 and 4 may be connected by a thin bottom plate.

While an embodiment and application of the invention has been shown and described, it will be apparent to those skilled in the art that many more modifications are possible without departing from the inventive concepts herein described.

I claim:

1. A device for converting rotary motion of an eccentric driven by a shaft into reciprocating motion of a working tool connectable to a power drive in a powered appliance including a housing comprising:
    a swing bridge member having a substantially planar bridge yoke portion coupled to the power drive;
    a first and second wall, each having a free end, projecting at approximately right angles from said bridge yoke portion, said first and second walls forming a rigid unit with said bridge yoke portion for reciprocating movement therewith, said first wall including a wall aperture;
    first and second flexible hinge members each having a first and second end, said first end of said first hinge member connected to said free end of said first wall and said first end of said second hinge member connected to said free end of said second wall, said second ends of said first and second hinge members being connectable to the housing of the powered appliances, said first flexible hinge member including a hinge aperture; and
    a connecting rod having a first end connectable with the eccentric and a second end connected to said swing bridge member, said connecting rod being aligned parallel to said planar bridge yoke portion and positioned through said wall aperture of said first wall and through said hinge aperture of said first flexible hinge portion.

2. The device as in claim 1 wherein said second end of said connecting rod is connected to said second wall of said swing bridge member.

3. The device as in claim 2 further including at least one strip member connecting said first and second walls and a web member connecting said strip member with said bridge yoke portion for reinforcing said bridge yoke member and said first and second walls.

4. The device as in claim 3 wherein said swing bridge member is mounted suspended in the housing of the powered appliance.

5. The device as in claim 2 further including a third flexible hinge member integrally formed on said connecting rod proximate said second end of said connecting rod and wherein said second end of said connecting rod is connected to said second wall proximate said free end of said wall.

* * * * *